Aug. 14, 1934. H. S. DE MALAUSSENE 1,970,498
COMBINED ELECTRICAL MOTOR AND GENERATOR
Filed June 5, 1931 3 Sheets-Sheet 1
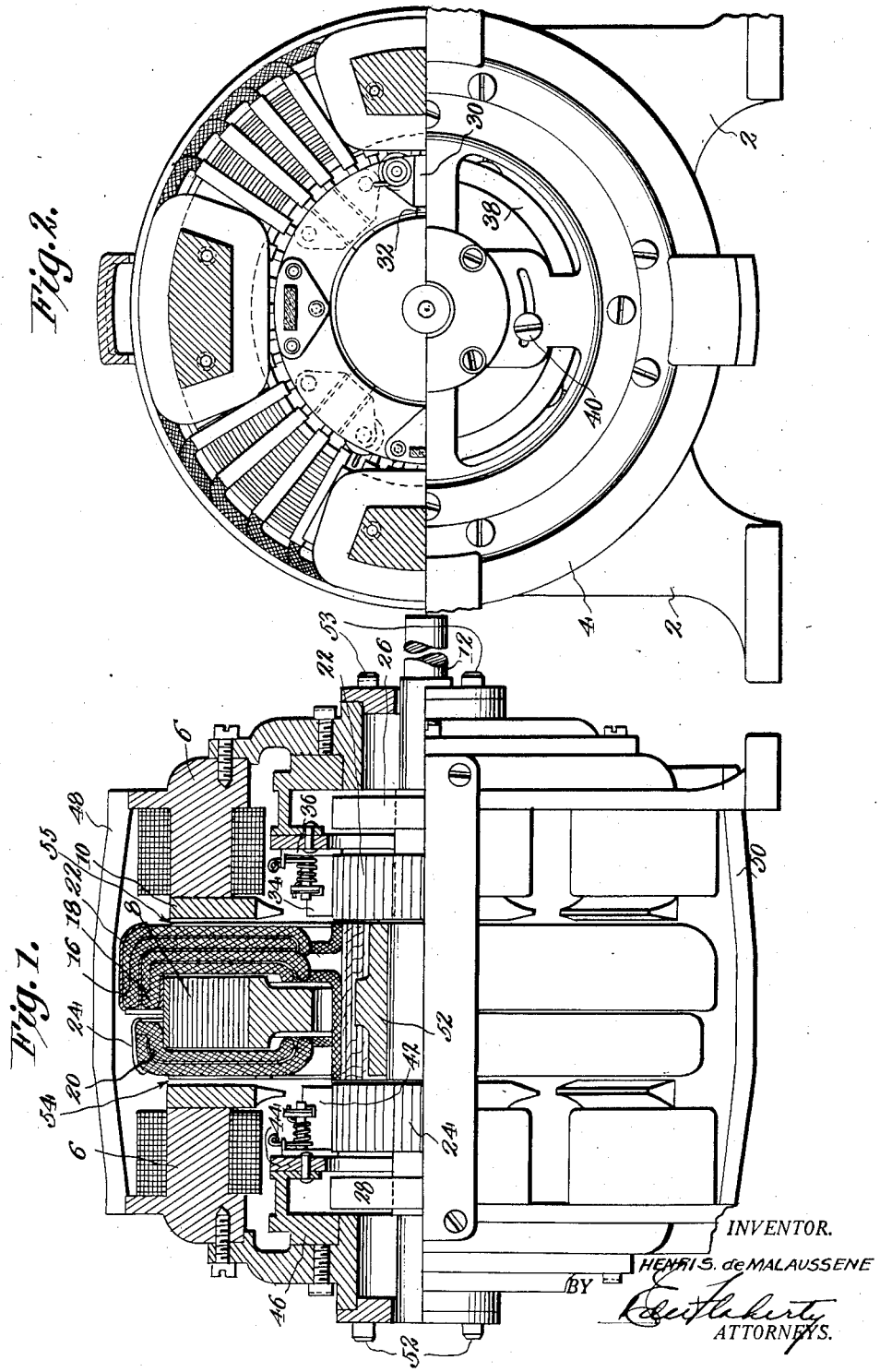
INVENTOR.
HENRI S. de MALAUSSENE
BY
ATTORNEYS.

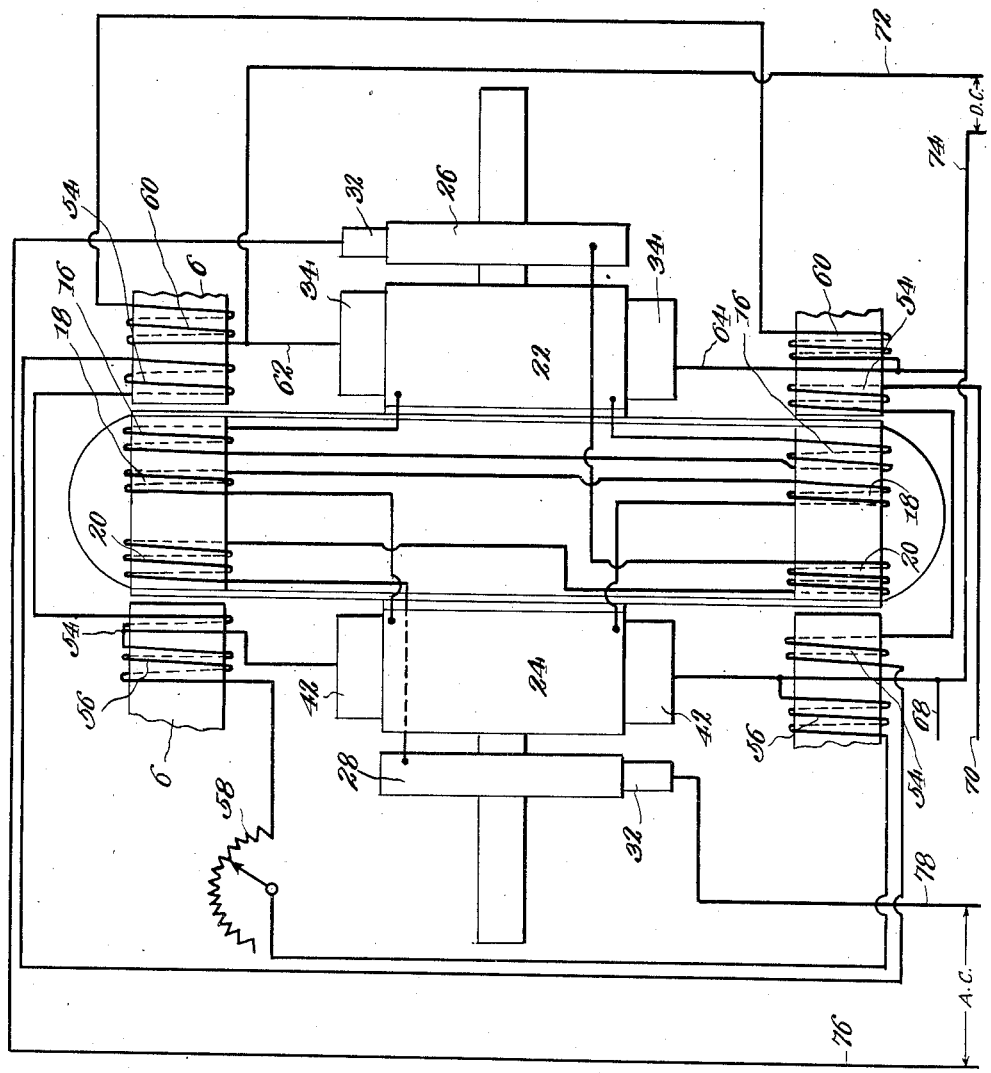

UNITED STATES PATENT OFFICE 1,970,498

COMBINED ELECTRICAL MOTOR AND GENERATOR

Henri S. de Malaussene, Los Angeles, Calif., assignor to Adolph L. Bernheimer, Santa Monica, Calif.

Application June 5, 1931, Serial No. 542,429

3 Claims. (Cl. 171—123)

This invention relates to an electrical machine and more particularly a combined motor generator unit having a direct current motor armature winding, a direct current generator armature winding, and an alternating current armature winding wound on a common armature.

The use of alternating current has many advantages over direct current and the supply of alternating current on farms, in camps or the like is in many cases unavailable, and it is one of the objects of this invention to provide a combined direct current motor, direct current generator, and alternating current generator assembled in one unit which is adapted to be supplied with power from a storage battery, to supply direct current for recharging the battery or for any other use, and to provide an alternating current supply to a load from the alternating current winding.

Another object of the invention is to provide an electrical machine of this character which utilizes a common armature on which all three of the windings are wound.

Another object of the invention is to arrange and connect the field windings of the unit in such a manner that they cooperate with the respective windings on the common armature to provide a field common to all of the armature windings.

Another object of the invention is to construct the unit in such a manner that each of the individual parts which necessarily require adjustment from time to time are readily accessible and independent of one another.

A still further object of the invention is to provide a combined machine of the class described which is efficient, cheap to manufacture and compact.

Other objects including simplicity and durability will become apparent during the course of the following description.

In the accompanying drawings forming a part of this application and in which like numerals are employed to designate like parts throughout the same:

Figure 1 is a front elevational view partly in section,

Figure 2 is a side elevational view partly in section taken on line A—A of Figure 1, Figure 3 is a diagrammatical view illustrating the electrical connections of the machine.

Figure 4:
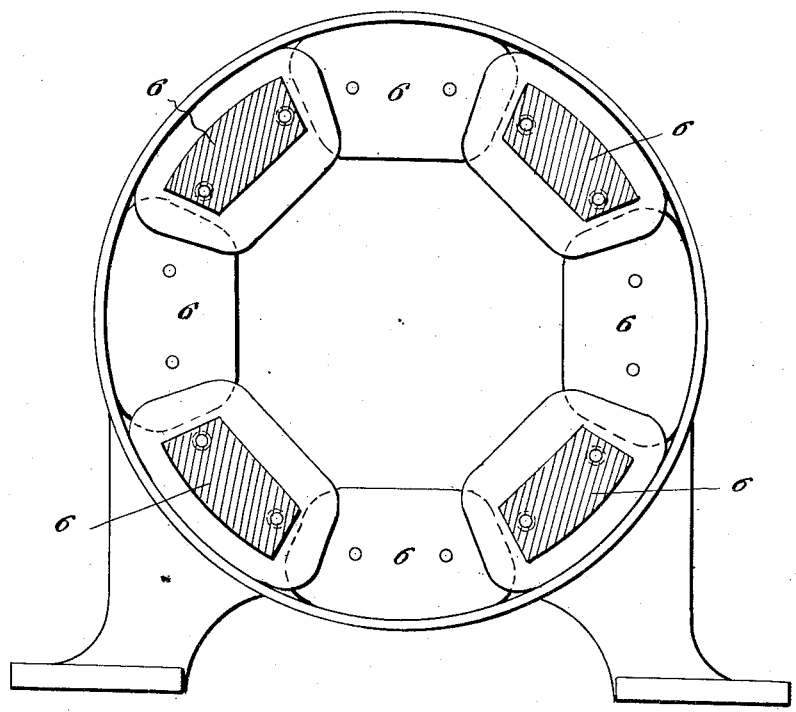
Figure 4 is a view showing the poles arranged in staggered relationship.

In the drawings wherein for the purpose of illustration is shown a preferred embodiment of the invention, the numeral 2 designates a space or support on which is fixed a yoke 4 carrying the field poles 6 between which the armature 8 revolves. The opposing poles in the field are staggered instead of being arranged directly opposite thereby utilizing the moment of inertia which would have taken place if the poles had been directly opposite. The field poles are arranged 90 degrees apart and are provided with pole faces 10. It is to be understood, however, that the invention is not limited to this particular number of poles inasmuch as it is believed obvious to any one skilled in the art that any number of poles may be used.

A shaft 12 is mounted in suitable bearings 14 and carries an armature which is disposed between the opposed pole faces of the poles 6. The armature is provided with three independent sets of armature windings, direct current generator armature winding 16, direct current motor armature winding 18 and alternating current armature winding 20 which are separated by suitable insulating material 22 and 24.

The direct current generator armature winding 16 is connected to the commutator 34 disposed on shaft 12, and the direct current motor armature winding 18 is connected to the motor commutator 42 also on shaft 12. Slip rings 26 and 28 fixed to shaft 12 are connected to the alternating current generator winding 20. The slip rings 26 and 28 are provided with brush holders 30 containing brushes 32 for supplying alternating current to a load or the like. The direct current motor armature is provided with a plurality of brushes 42 disposed in brush holders 44 fixed to an adjustable ring 38 which is adjustably secured to the yoke 4 by means of a bolt 40. The direct current generator commutator is likewise provided with a plurality of brushes 42 mounted in brush holders 44 which are disposed on a similar ring 46 arranged on a ring adjustable with respect to the yoke in the same manner as the adjustable ring of the direct current motor brush holder. The yokes 4 to which the field poles are arranged, are secured together by members 48 and 50 disposed on the upper and lower portions of the machine. The pole pieces 6 are fixed to the machine by screw threaded bolts 52 and 53 and may be moved longitudinal to any position thereby providing a novel means of adjusting the air gaps 54 and 55.

As is clearly indicated from the drawings, the adjustment of the air gap and the brush settings for the different machines are independent and readily accessible. The common armature 8 is of the laminated type and is keyed to the shaft 12 by means of key 52. It is to be understood, however, that the invention is not limited to the particular structure of the armature since it may within the scope of the invention be constructed in accordance with any of the well known armature designs.

Referring now more particularly to Figure 3 which illustrates the electrical connections of the combined machine, each of the field poles are provided with series windings 54 having one of the terminals connected to one of the brushes 42 of the direct current motor commutator, and the other terminal providing one of the direct current terminals of the machine. There is also provided on each of the poles a shunt field motor winding 56 which is connected across the brushes 42 of the direct current motor commutator through a variable resistance 58, the variable resistance providing a means for varying the speed of the machine. The direct current generator is also provided with shunt field windings 60 wound on each of the pole pieces and connected to brushes 34 of the direct current commutator through conductors 62 and 64.

As clearly indicated in the drawings the series field windings for the direct current motor and the direct current generator are energized from the motor brush leads. The fields are so wound that the windings compensate for voltage variation. The direct current motor windings are supplied with power from a direct current source such as a battery or the like through conductors 68 and 70. The direct current supply is taken from conductors 72 and 74 which are connected to the brushes of the direct current commutator and the alternating current supply is obtained from conductors 78 connected to slip rings 26 and 28 through brushes 32.

It will be seen that I have provided a combined direct current motor, direct current generator, and alternating current generator in a single unit which may be utilized in obtaining an alternating current electrical supply from a direct current source of any character.

For example, the direct current motor may be wound to operate at 30 volts and the direct current generator to supply a voltage of 32 volts whereas the alternating current windings may be wound to supply voltages of 115 volts, thereby making it possible to operate the direct current motor by means of a plurality of storage batteries and obtain 115 volt alternating current from the machine to supply a load for electrifying farms, camps or the like, and at the same time providing a means for recharging the storage batteries.

Obviously the combined machine is capable of many uses, and may be constructed and designed to any capacity and is capable of various modifications and changes without departing from the spirit and scope of the invention, and it is intended therefore, that only such limitations shall be imposed thereon as are indicated in the prior art or in the appended claims.

What I claim is:

1. In an electrical machine, a rotatable armature, a direct current motor armature winding, a direct current generator armature winding and an alternating current armature winding on said armature, a pair of commutators for said direct current windings, slip rings for said alternating current winding, a plurality of groups of poles on each side of said armature, the groups of poles on one side of the armature being staggered in relation to the group of poles on the other side, and shunt and series field windings for each of said direct current armature windings on said field poles.

2. In an electrical machine, a rotatable disc armature, a direct current motor winding, a direct current generator winding, and an alternating current armature winding on said armature, a commutator for each of said direct current armature windings, slip rings for said alternating current winding, field poles on each side of said armature, the poles on one side of the armature being staggered in relation to the poles on the other side, and having windings thereon for producing a magnetic field.

3. In an electrical machine, a rotatable armature, a direct current motor armature winding, a direct current generator armature winding and an alternating current armature winding on said armature, a pair of commutators for said direct current windings, slip rings for said alternating current windings, poles on each side of said armature, the poles on one side of the armature being staggered in relation to the poles on the other side thereof, and said poles being provided with windings for producing a magnetic field.

HENRI S. DE MALAUSSENE.